United States Patent
Draznin et al.

(10) Patent No.: US 9,198,022 B1
(45) Date of Patent: *Nov. 24, 2015

(54) MANAGING ROAMING POLICIES USING A CENTRALIZED STORAGE DEVICE

(71) Applicant: Verizon Patent and Licensing Inc., Arlington, VA (US)

(72) Inventors: Sagiv Draznin, Walnut Creek, CA (US); Amol Tuli, Dublin, CA (US); Miguel A. Carames, Martinez, CA (US); Javier M. Lopez, Alameda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/287,743

(22) Filed: May 27, 2014

(51) Int. Cl.
*H04W 8/12* (2009.01)
*H04W 60/00* (2009.01)
*H04L 29/12* (2006.01)

(52) U.S. Cl.
CPC ............. *H04W 8/12* (2013.01); *H04L 61/1588* (2013.01); *H04W 60/00* (2013.01)

(58) Field of Classification Search
CPC ..... H04W 12/06; H04W 48/18; H04W 84/12; H04W 12/02; H04W 8/12; H04W 92/02; H04W 88/16; H04W 8/02; H04W 40/02; H04W 76/022; H04W 28/0226; H04W 36/0055; H04W 48/20; H04W 4/001; H04W 60/00; H04W 72/0453; H04W 76/062; H04W 8/082; H04W 16/00; H04W 28/0231; H04W 28/0263; H04W 36/0022; H04W 36/0072; H04W 36/08; H04W 36/32; H04W 40/246; H04W 76/025; H04W 84/045; H04W 84/10; H04W 88/005; H04W 88/184; H04W 8/04; H04W 8/06; H04W 8/22; H04W 92/00; H04L 47/14; H04L 63/08; H04L 12/5895; H04L 63/0892; H04L 63/20; H04L 12/4633; H04L 47/20; H04L 63/1408; H04L 67/327; H04L 12/1407; H04L 12/1485; H04L 12/465; H04L 12/5691; H04L 12/5692; H04M 15/8038; H04M 15/8033; G06Q 30/0267; G06Q 30/0269

See application file for complete search history.

(56) References Cited

U.S. PATENT DOCUMENTS

| 7,869,803 B2 * | 1/2011 | Corson et al. ................. 455/433 |
| 2008/0160958 A1 * | 7/2008 | Abichandani et al. ......... 455/410 |
| 2013/0007853 A1 * | 1/2013 | Gupta et al. ...................... 726/5 |

* cited by examiner

*Primary Examiner* — Nizar Sivji

(57) ABSTRACT

A device may receive a network identifier and roaming policy information associated with the network identifier. The roaming policy information may identify a manner in which to treat traffic associated with mobile devices that are associated with a home network identified by the network identifier. The device may store the network identifier and the roaming policy information using a global roaming policy data structure. The device may provide the network identifier and the roaming policy information to a mobility management entity device for storage using a local roaming policy data structure accessible by the mobility management entity device. The mobility management entity device may be one of multiple mobility management entity devices having access to respective local roaming policy data structures.

20 Claims, 15 Drawing Sheets

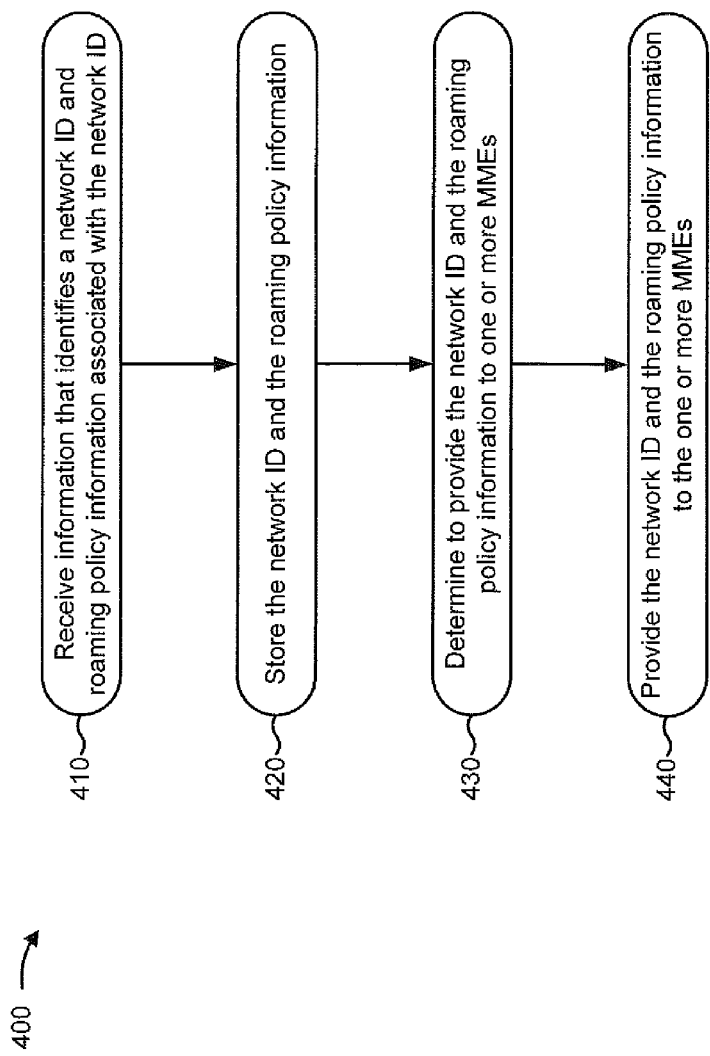

MANAGING ROAMING POLICIES USING A CENTRALIZED STORAGE DEVICE

BACKGROUND

In wireless telecommunications, roaming may refer to the ability for a cellular customer to make and receive voice calls, send and receive data, or access other services, including home data services, when travelling outside the geographical coverage area of the cellular customer's home network, by using a visited network.

BRIEF DESCRIPTION OF THE DRAWINGS

FIG. 4 is a flow chart of an example process for managing roaming policies using a centralized storage device;

DETAILED DESCRIPTION PREFERRED EMBODIMENTS

The following detailed description of example implementations refers to the accompanying drawings. The same reference numbers in different drawings may identify the same or similar elements.

A network operator, associated with a first network (e.g., a cellular network), may enter an agreement associated with a second network to permit customers of the second network to use the first network for roaming network access. In this way, a user may be permitted to access the user's home network or other network services via a visited network, and the visited network may charge the user of the home network to permit such access under an agreed-upon roaming policy. However, when such an agreement is entered, a network operator of the visited network may be required to individually adjust a configuration of various devices throughout the network that manage roaming policies, such as mobility management entity devices (MMEs). When the visited network is large, this configuration may be complex and time-consuming. Implementations described herein simplify the configuration and management of roaming policies across a large network by using a centralized storage device.

Figure 1:
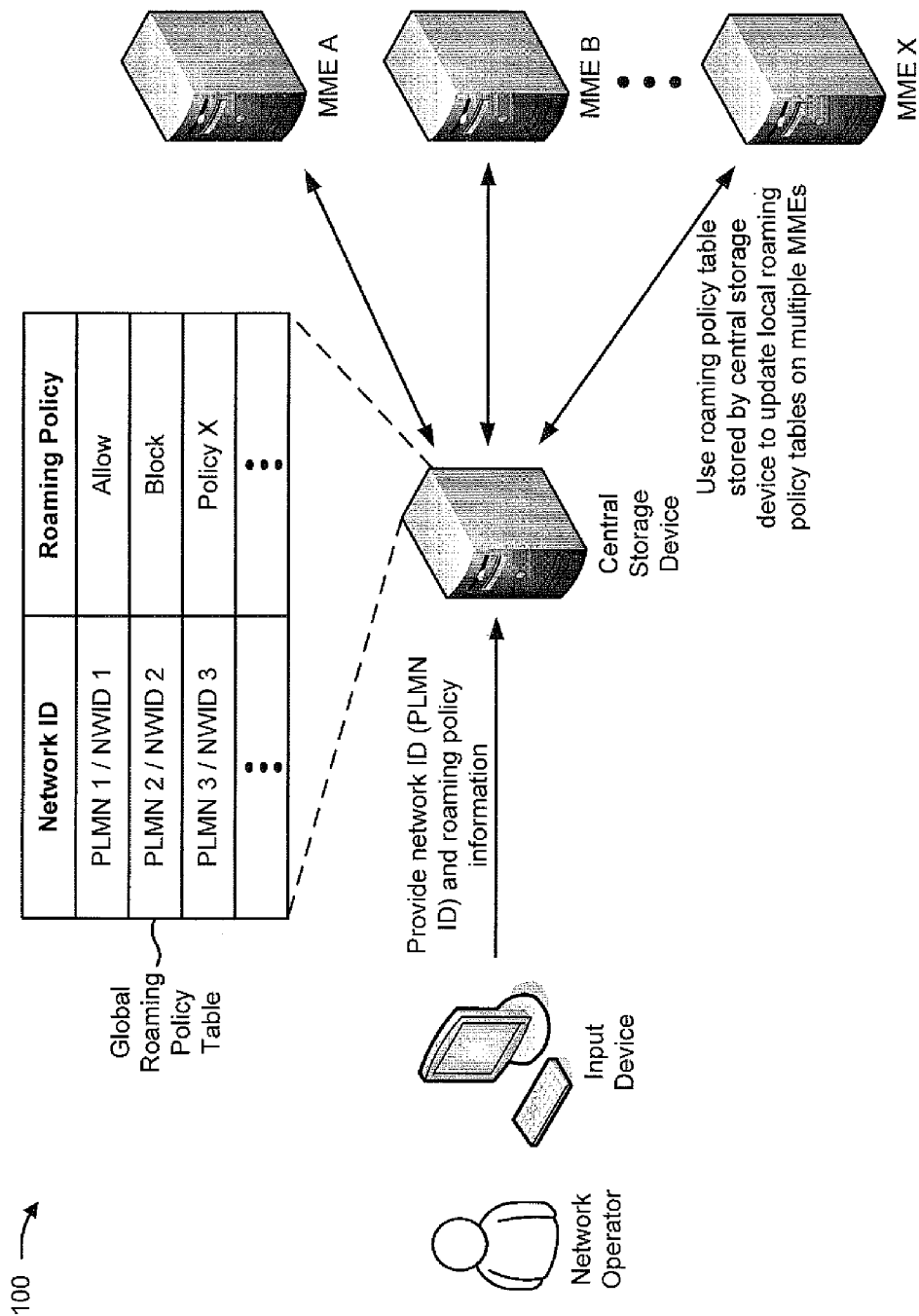
FIG. 1 is a diagram of an overview of an example implementation described herein.

FIG. 1 is a diagram of an overview of an example implementation 100 described herein. As shown in FIG. 1, a network operator may interact with an input device to provide a network identifier (ID), such as a public land mobile network (PLMN) ID, and roaming policy information to a central storage device. The network ID may identify a home network or a network from which a mobile device is handed off, and the roaming policy information may identify a manner in which mobile devices, associated with users that are subscribers of the home network or are handed off from the identified network, are to be treated when accessing or using a visited network. The central storage device may manage the roaming policies for the visited network. As shown, the central storage device may store a global roaming policy table that associates a network ID with a roaming policy for a network identified by the network ID.

As further shown in FIG. 1, the central storage device may communicate with multiple MMEs to update local roaming policy tables stored by the MMEs using the global roaming policy table stored by the central storage device. This update may occur in various ways, as described in more detail elsewhere herein. An MME may use a local roaming policy table to manage roaming requests from mobile devices. For example, an MME may identify a network ID associated with a mobile device (e.g., based on a PLMN ID included in a mobile device identifier, based on a network associated with a globally unique temporary identifier (GUTI) received from a handed-off mobile device, etc.). The MME may use the local roaming policy table to identify a roaming policy corresponding to the network ID, and may apply the roaming policy to the mobile device (e.g., may handle network traffic associated with the mobile device based on the roaming policy). In this way, the central storage device may simplify roaming policy configuration and management across multiple MMEs.

Figure 2:
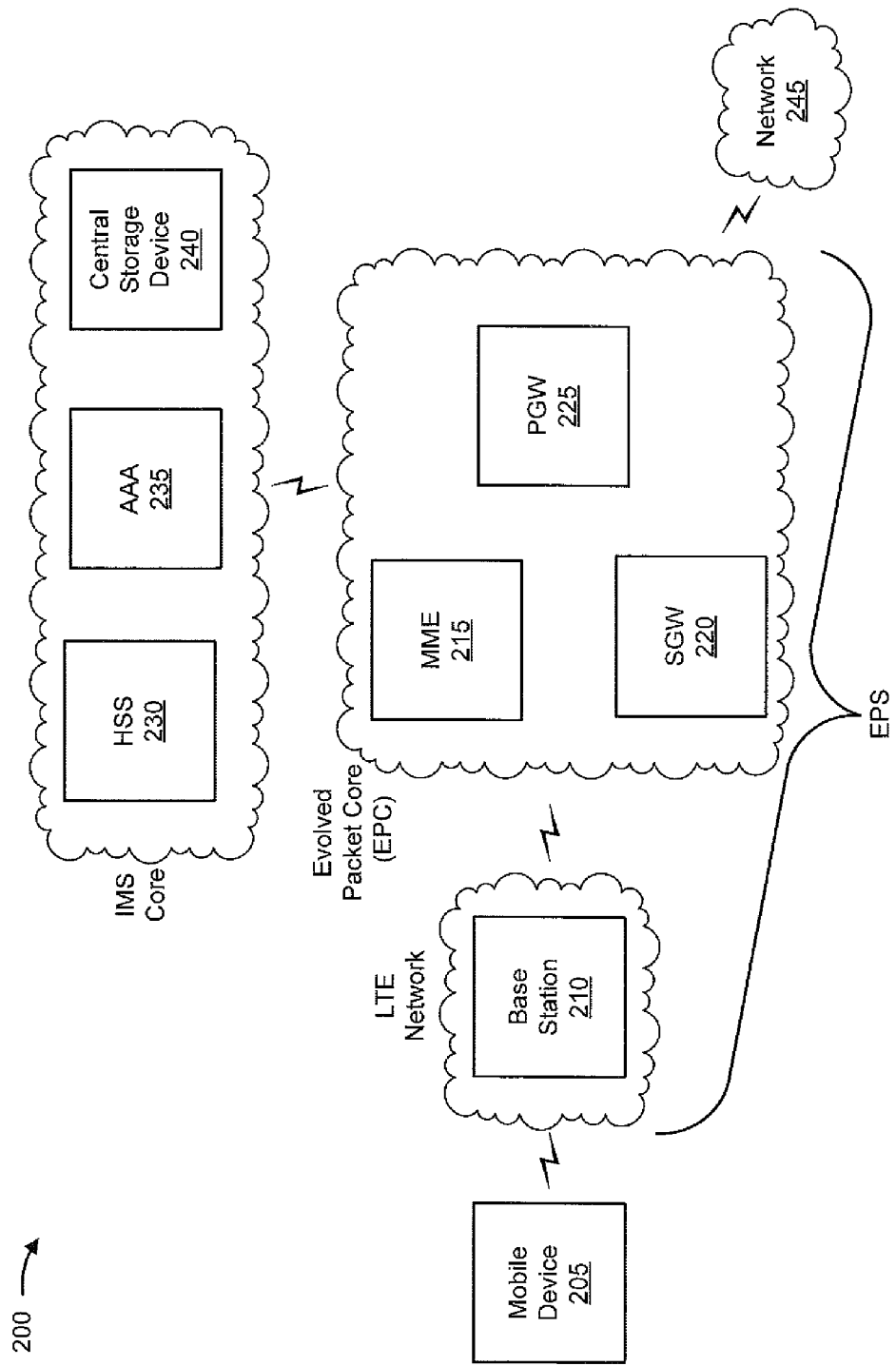
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a central storage device 240; and a network 245. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile devices 205 communicate with the EPC. The EPC may include MME 215, SGW 220, and/or PGW 225 that enable mobile devices 205 to communicate with network 245 and/or an Internet protocol (IP) multimedia subsystem (IMS) core. The IMS core may include HSS 230, AAA 235, and/or central storage device 240, and may manage device registration, device authentication, session initiation, etc., associated with mobile device 205. HSS 230, AAA 235, and/or central storage device 240 may reside in the EPC and/or the IMS core.

Mobile device 205 may include one or more devices capable of communicating with base station 210 and/or a network (e.g., network 245). For example, mobile device 205 may include a wireless communication device, a radiotelephone, a personal communications system (PCS) terminal (e.g., that may combine a cellular radiotelephone with data processing and data communications capabilities), a personal digital assistant (PDA), a smart phone, a laptop computer, a tablet computer, a personal gaming system, and/or a similar device. Mobile device 205 may send traffic to and/or receive traffic from network 245 (e.g., via base station 210, SGW 220, and/or PGW 225).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 245 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215). Each MME 215 may store a local roaming policy data structure that identifies a roaming policy to be applied to mobile device 205 associated with a particular network ID. Each MME 215 may update the local roaming policy data structure based on a global roaming policy data structure stored by central storage device 240. In some implementations, MME 215 may include a serving general packet radio service (GPRS) support node (SGSN), such as an SGSN associated with a 2G network, a 3G network, etc.

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 245 (e.g., via PGW 225) and/or other network devices associated with the EPC and/or the IMS core. SGW 220 may also receive traffic from network 245 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 245. Additionally, or alternatively, PGW 225 may receive traffic from network 245, and may send the traffic to mobile device 205 via SGW 220 and base station 210. PGW 225 may record data usage information (e.g., byte usage), and may provide the data usage information to AAA 235.

HSS 230 may include one or more devices, such as one or more server devices, capable of managing (e.g., receiving, generating, storing, processing, and/or providing) information associated with mobile device 205. For example, HSS 230 may manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 may include one or more devices, such as one or more server devices, that perform authentication, authorization, and/or accounting operations for communication sessions associated with mobile device 205. For example, AAA 235 may perform authentication operations for mobile device 205 and/or a user of mobile device 205 (e.g., using one or more credentials), may control access, by mobile device 205, to a service and/or an application (e.g., based on one or more restrictions, such as time-of-day restrictions, location restrictions, single or multiple access restrictions, read/write restrictions, etc.), may track resources consumed by mobile device 205 (e.g., a quantity of voice minutes consumed, a quantity of data consumed, etc.), and/or may perform similar operations.

Central storage device 240 may include one or more devices, such as one or more server devices, capable of generating, receiving, storing, processing, and/or providing information associated with a roaming policy. For example, central storage device 240 may store a global roaming policy data structure that includes network IDs and roaming policy information that identifies a roaming policy for a network associated with a particular network ID. Central storage device 240 may use the global roaming policy data structure to update local roaming policy data structures stored by individual MMEs 215.

Network 245 may include one or more wired and/or wireless networks. For example, network 245 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
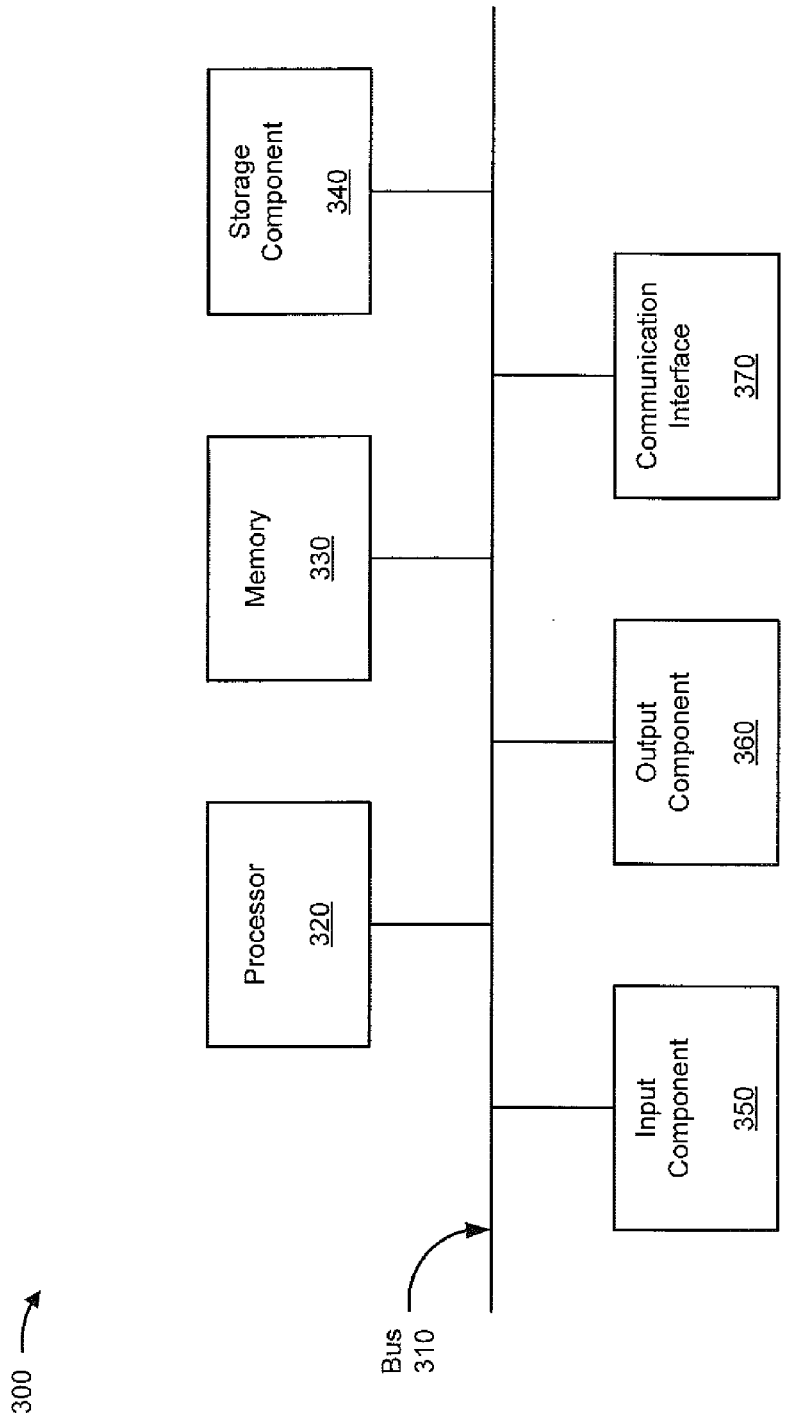
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, HSS 230, AAA 235, and/or central storage device 240. In some implementations, mobile device 205, base station 210, MME 215, SGW 220, PGW 225, HSS 230, AAA 235, and/or central storage device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for managing roaming policies using a centralized storage device. In some implementations, one or more process blocks of FIG. 4 may be performed by central storage device 240. Additionally, or alternatively, one or more process blocks of FIG. 4 may be performed by another device or a group of devices separate from or including central storage device 240, such as mobile device 205, base station 210, MME 215, SGW 220, PGW 225, HSS 230, and/or AAA 235.

As shown in FIG. 4, process 400 may include receiving information that identifies a network ID and roaming policy information associated with the network ID (block 410). For example, central storage device 240 may receive, based on input provided by a network operator (e.g., interacting with an input device), information that identifies a network ID, and may receive roaming policy information associated with the network ID. As an example, network operators associated with two different networks may enter an agreement regarding a roaming policy, and a network operator of the first network may interact with an input device to provide a network ID, that identifies the second network, and roaming policy information that identifies the roaming policy. Central storage device 240 may receive the network ID and the roaming policy information from the input device. The roaming policy information may identify, for example, a new roaming policy, an update to an existing roaming policy, etc.

The network ID may include, for example, a PLMN ID that identifies a public land mobile network (e.g., associated with a particular network operator). A public land mobile network may refer to a network that is established and/or operated (e.g., by a network operator) to provide land mobile telecommunication services to the public. In some implementations, the PLMN ID may include information that identifies a country (or another geographic region), such as a mobile country code (MCC). Additionally, or alternatively, the PLMN ID may include information that identifies a network operator, such as a mobile network code (MNC).

As an example, the PLMN ID may include both an MCC and an MNC. The combination of the MNC and the MCC (e.g., an MCC/MNC tuple) may uniquely identify a mobile network operator of a PLMN. As an example, the MCC may include a three digit code that identifies a country (e.g., 310 for the United States, 440 for Japan, etc.). As another example, the MNC may include a two or three digit code that identifies a mobile network operator (e.g., 004 for Verizon in the United States, 40 for SoftBank Mobile Corporation in Japan, etc.). Thus, in some implementations, the PLMN ID may include a five or six digit code that uniquely identifies a mobile network operator (e.g., in a particular country).

Additionally, or alternatively, the network ID may include other information that identifies a network, such as a name of a network operator, a unique identifier associated with a network operator, or the like.

The roaming policy information may identify a manner in which mobile devices 205, that are subscribed to and/or registered with a home network identified by the network ID, are to be treated when roaming using a visited network. The visited network may use central storage device 240 to manage roaming policies for different home networks. As an example, the roaming policy information may indicate that mobile devices 205 are to be permitted to roam via the visited network (e.g., to access one or more services and/or resources via the visited network), are to be blocked from roaming via the visited network, etc.

Additionally, or alternatively, the roaming policy information may identify a service that mobile device 205 is permitted to access or is blocked from accessing (e.g., a voice service, a data service, etc.), may identify a quality of service parameter to be applied to traffic associated with mobile device 205 (e.g., a guaranteed bit rate, a non-guaranteed bit rate, a minimum/maximum bandwidth, a latency, etc.), may identify whether to provide a user of mobile device 205 with an option to pay for roaming access to the visited network (e.g., at a particular rate, such as a flat rate, a per minute rate, etc., identified by the roaming policy), or the like. Additionally, or alternatively, the roaming policy information may identify a default policy to be applied to mobile devices 205, associated with a particular network ID, when central storage device 240 does not store information that identifies a roaming policy associated with the particular network ID (e.g., a default policy to block roaming access, a default policy to allow roaming access, a default policy to provide an option to pay for roaming access, etc.).

As further shown in FIG. 4, process 400 may include storing the network ID and the roaming policy information (block 420). For example, central storage device 240 may store the network ID and the roaming policy information, and may store an indication of a relationship between the network ID and the roaming policy information. In some implementations, central storage device 240 may store the network ID and the roaming policy information using a global roaming policy data structure (e.g., a database, a data table, etc.). Additionally, or alternatively, central storage device 240 may store information that identifies a date and/or a time associated with the network ID and/or the roaming policy information, such as a data and/or time that the network ID and/or the roaming policy information was stored in the data structure, a date and/or a time that the network ID and/or the roaming policy information was received by central storage device 240, etc. In some implementations, central storage device 240 may store information that identifies a time period during which a roaming policy is to be applied to mobile devices 205 associated with a network identified by a network ID.

As further shown in FIG. 4, process 400 may include determining to provide the network ID and the roaming policy information to one or more MMEs (block 430), and providing the network ID and the roaming policy information to the one or more MMEs (block 440). For example, central storage device 240 may determine to provide the network ID and the roaming policy information to one or more MMEs 215 associated with the visited network. Central storage device 240 may provide this information to all MMEs 215 or a portion of MMEs 215 associated with the visited network. For example, a first roaming policy may be applied in a first geographic region associated with one or more first MMEs 215, and a second roaming policy may be applied in a second geographic region associated with one or more second MMEs 215. Central storage device 240 may identify MMEs 215 to which the network ID and the roaming policy information are to be provided, and may provide the network ID and the roaming policy information to the identified MMEs 215.

In some implementations, central storage device 240 may determine which network IDs and corresponding roaming policies to provide to MME(s) 215. As an example, central storage device 240 may provide all network IDs and all roaming policies (e.g., all information stored in the global roaming policy data structure) to MME(s) 215. In some cases, central storage device 240 may provide a copy of the global roaming policy data structure to each MME 215. As another example, central storage device 240 may provide a respective subset of the global roaming policy data structure to each MME 215 (e.g., the same subset or a different subset). In some implementations, central storage device 240 may provide a copy of the global roaming policy data structure to some MMEs 215, and may provide a respective subset of the global roaming policy data structure to other MMEs 215. In some cases, central storage device 240 may determine a date and/or a time that a particular MME 215 was last updated, and may provide, to the particular MME 215, network IDs and roaming policies that have been added and/or modified after the date and/or time. Central storage device 240 may provide added and/or modified items to all MMEs 215 or a subset of one or more MMEs 215 (e.g., based on central storage device 240 receiving a new/modified item, based on central storage device 240 determines which items to provide to which MMEs 215, etc.).

In some implementations, central storage device 240 may periodically provide information (e.g., the network ID and the roaming policy information) to MME(s) 215 (e.g., once per day, once per week, etc.). Additionally, or alternatively, central storage device 240 may provide the information when the global roaming policy data structure is updated (e.g., when a new network ID and/or new roaming policy information is added to the data structure, when a network ID and/or roaming policy information is updated or modified, etc.). Additionally, or alternatively, central storage device 240 may provide, to MME(s) 215, an indication that a new or updated network ID and/or roaming policy is available, and MME(s) 215 may request the new/updated network IDs and/or roaming policies based on the indication (e.g., during a time period when MME 215 is associated with an amount of network traffic below a threshold). Additionally, or alternatively, central storage device 240 may provide the information based on a request from MME 215. In some implementations, the request may identify a date and/or a time of a most recent update, and central storage device 240 may provide network IDs and/or roaming policies that have been added and/or modified (e.g., in the global roaming policy data structure) since the most recent update.

In some implementations, the manner in which central storage device 240 provides information to MMEs 215 may be based on whether the roaming policy information is new roaming policy information (e.g., associated with a network ID not previously stored in the global roaming policy data structure, associated with a home network with which the visited network did not have a previous agreement, etc.) or updated roaming policy information (e.g., associated with a network ID already stored in the global roaming policy data structure, associated with a home network with which the visited network had a previous agreement, etc.). For example, central storage device 240 may periodically provide new roaming policy information to MMEs 215, and may provide updated roaming policy information to MMEs 215 as the updated roaming policy information is received (e.g., within a threshold time period after receiving the updated roaming policy information).

Additionally, or alternatively, the manner in which central storage device 240 provides information to MMEs 215 may be based on a type of roaming policy identified in the roaming policy information. For example, a roaming policy of "Allow" may be provided periodically, while a roaming policy of "Block" may be provided within a threshold amount of time after information that identifies the roaming policy is received by central storage device 240. Additionally, or alternatively, central storage device 240 may receive input (e.g., from a network operator interacting with an input device) that identifies a manner in which information is to be provided to MMEs 215.

When central storage device 240 provides a network ID and/or roaming policy information associated with the network ID to MME 215, MME 215 may update a local roaming policy data structure to store a relationship between the network ID and the roaming policy information. MME 215 may use the local roaming policy data structure to apply roaming policies to mobile devices 205, as described in more detail elsewhere herein. In this way, central storage device 240 may simplify the configuration and management of roaming policies across a large quantity of MMEs 215 using the global roaming policy data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
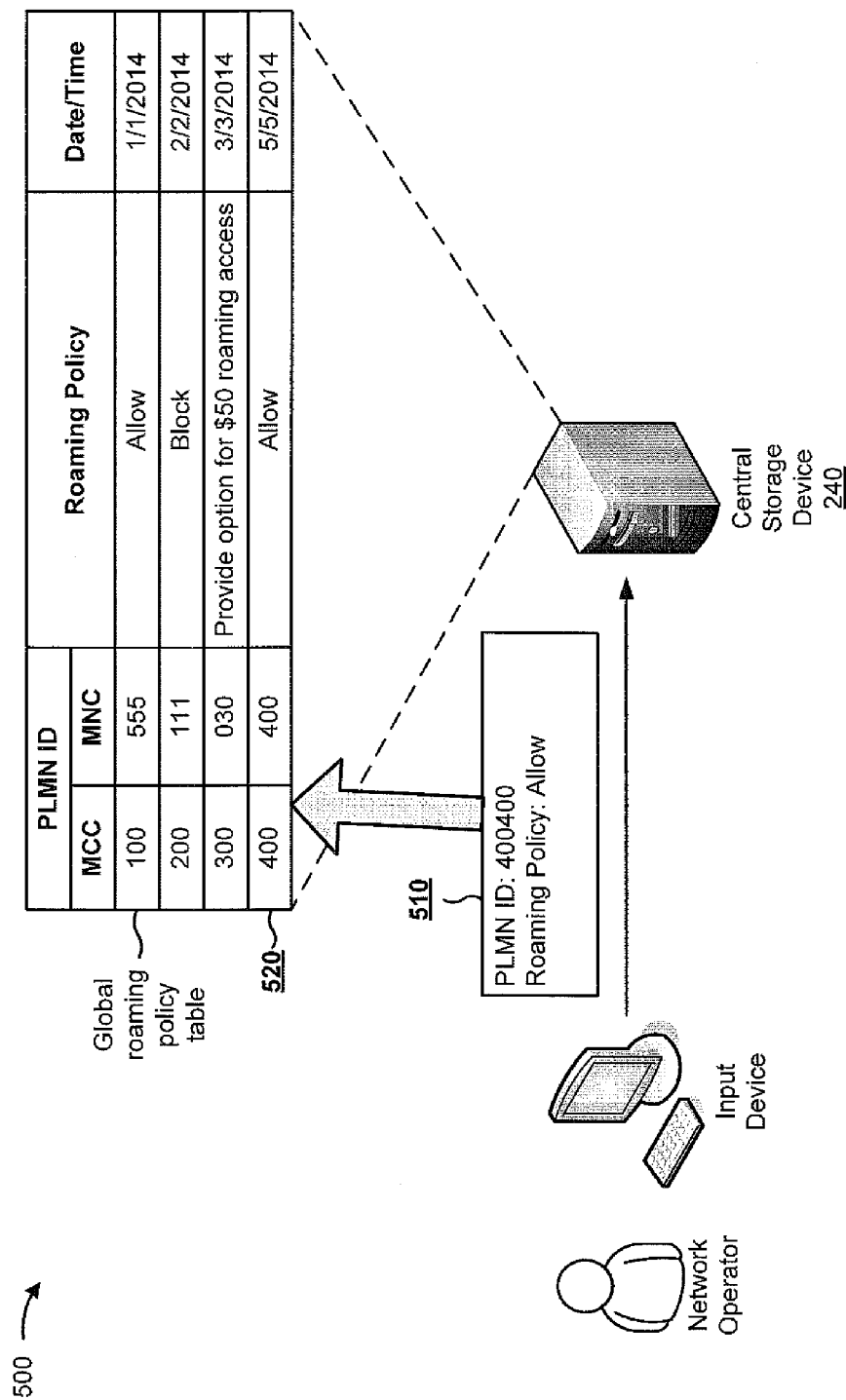
FIGS. 5A and 5B are diagrams of an example implementation relating to the example process shown in FIG. 4.
Figure 5B:
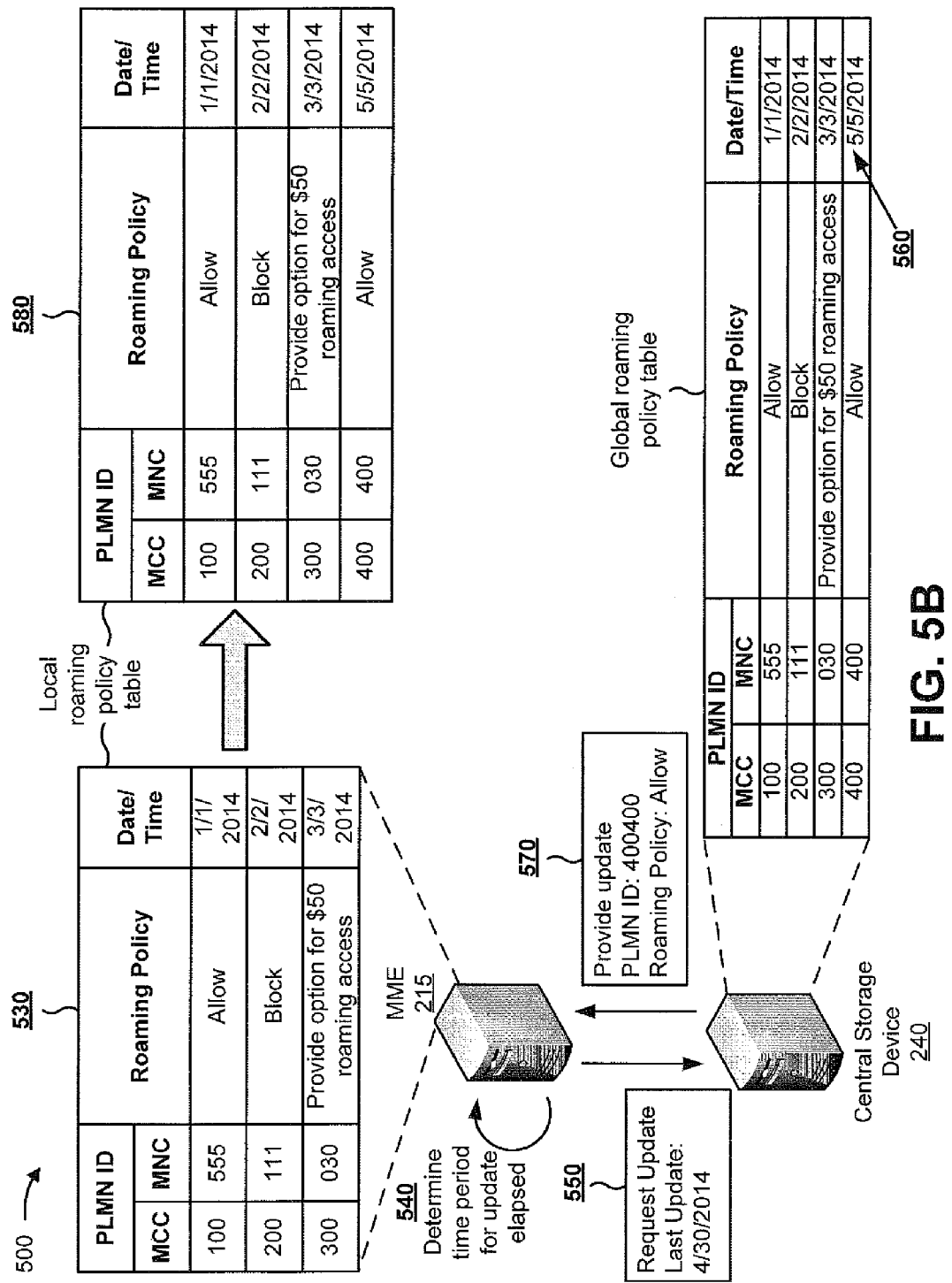

FIGS. 5A and 5B are diagrams of an example implementation 500 relating to example process 400 shown in FIG. 4. FIGS. 5A and 5B show an example of managing roaming policies using a centralized storage device.

As shown in FIG. 5A, and by reference number 510, assume that a network operator interacts with an input device to identify a PLMN ID, shown as "400400," and a roaming policy, shown as "Allow," associated with the PLMN ID. Assume that the network operator is associated with a first PLMN, and that the network operator enters into an agreement with another network operator, that works for a second PLMN identified by the PLMN ID of "400400." Further, assume that the agreement will allow mobile devices 205, associated with the second PLMN, to roam using the first PLMN.

Assume that central storage device 240 receives the input information from the input device, and stores the PLMN ID and roaming policy information in a global roaming policy table, as shown by reference number 520. As shown, assume that the global roaming policy table stores a PLMN ID, which includes an MCC and an MNC, roaming policy information associated with the PLMN ID, and a date/time at which the global roaming policy table was updated to include the PLMN ID and the roaming policy information.

For example, the first row of the table indicates that mobile devices 205, associated with a PLMN ID of "100555" (e.g., with an MCC of 100 and an MNC of 555), are to be allowed to roam via a visited network associated with central storage device 240, and that this PLMN ID (e.g., "100555") and roaming policy information (e.g., "Allow") were added to or updated in the global roaming policy table on Jan. 1, 2014. Similarly, the second row of the table indicates that mobile devices 205, associated with a PLMN ID of "200111," are to be blocked from roaming via the visited network, and that this PLMN ID and roaming policy information were added to or updated in the global roaming policy table on Feb. 2, 2014. The third row of the table indicates that mobile devices 205, associated with a PLMN ID of "300030," are to be provided an option to roam via the visited network for a flat fee of $50, and that this PLMN ID and roaming policy information were added to or updated in the global roaming policy table on Mar. 3, 2014.

As shown in FIG. 5B, and by reference number 530, assume that a local roaming policy table, stored by MME 215, includes the first three rows of the global roaming policy table, but has not yet been updated to include the fourth row (e.g., the PLMN ID of "400400" and the corresponding roaming policy of "Allow"). As shown by reference number 540, assume that MME 215 determines that a time period for an update (e.g., one day, one week, etc.) has elapsed.

As shown by reference number 550, based on this determination, assume that MME 215 requests an update from central storage device 240, and further provides information that identifies a date/time of a most recent update to the local roaming policy table, shown as Apr. 30, 2014. Assume that central storage device 240 uses the date/time of the most recent update to identify PLMN IDs and roaming policies that have not been provided to MME 215. For example, as shown by reference number 560, assume that central storage device 240 determines that the PLMN ID of "400400" and the corresponding roaming policy of "Allow" have not been provided to MME 215, because this information was added to the global roaming policy table on May 5, 2014, which is after the most recent update of Apr. 30, 2014. Based on this determination, assume that central storage device 240 provides information that identifies the PLMN ID of "400400" and the corresponding roaming policy of "Allow" to MME 215, as shown by reference number 570. As shown by reference number 580, assume that MME 215 updates the local roaming policy table with the received information.

As indicated above, FIGS. 5A and 5B are provided merely as an example. Other examples are possible and may differ from what was described with regard to FIGS. 5A and 5B.

Figure 6:
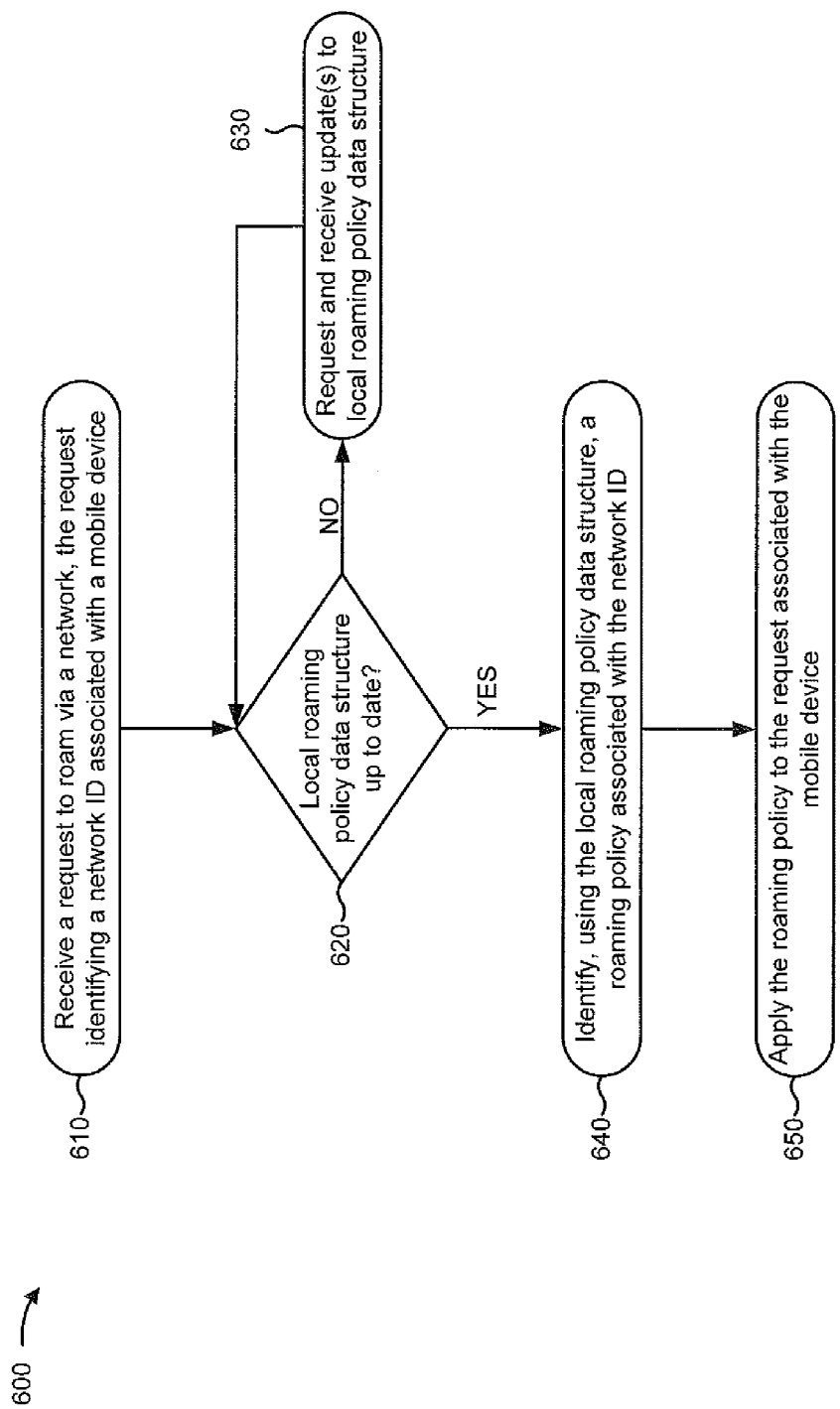
FIG. 6 is a flow chart of an example process for applying a roaming policy to a roaming request from a mobile device.

FIG. 6 is a flow chart of an example process 600 for applying a roaming policy to a roaming request from a mobile device. In some implementations, one or more process blocks of FIG. 6 may be performed by MME 215. Additionally, or alternatively, one or more process blocks of FIG. 6 may be performed by another device or a group of devices separate from or including MME 215, such as mobile device 205, base station 210, SGW 220, PGW 225, HSS 230, AAA 235, and/or central storage device 240.

As shown in FIG. 6, process 600 may include receiving a request to roam via a network, the request identifying a network ID associated with a mobile device (block 610). For example, MME 215 may receive, from mobile device 205 (e.g., via base station 210), a request to roam via a visited network associated with MME 215. The request may include, for example, a request to access the visited network, a request to access a home network of mobile device 205 via the visited network, a request to access a service and/or a resource via the visited network, etc.

The request may identify a network ID associated with mobile device 205. For example, the request may identify a PLMN ID of a home network of mobile device 205 (e.g., a home network to which mobile device 205 is registered and/or subscribed). For example, the request may include an international mobile subscriber identity (IMSI) that identifies mobile device 205. The IMSI may include a PLMN ID (e.g., an MCC and an MNC), and a mobile subscription identification number (MSIN) (e.g., a mobile telephone number (MTN), a mobile identification number (MIN), etc.). As an example, the IMSI may include a fifteen or sixteen digit code (e.g., a three digit MCC, a two or three digit MNC, and a ten digit MSIN).

MME 215 may identify the PLMN ID using the received IMSI that identifies mobile device 205. For example, MME 215 may identify the first five or six digits (or characters) of the IMSI as the PLMN ID, depending on the length of the IMSI (e.g., fifteen or sixteen digits).

As another example, the request may identify a globally unique temporary identifier (GUTI) associated with mobile device 205. For example, mobile device 205 may be handed off to MME 215 from another network (e.g., from an MME 215 or a similar device associated with the other network). In this case, MME 215 may determine a network ID associated with the GUTI. For example, MME 215 may store a data structure that identifies relationships between GUTIs and network IDs. As another example, MME 215 may provide the GUTI to another device, and the other device may provide information that identifies a network ID associated with the GUTI. Additionally, or alternatively, the request may include the network ID.

As further shown in FIG. 6, process 600 may include determining whether a local roaming policy data structure is up to date (block 620). For example, MME 215 may determine whether a local roaming policy data structure is up to date. In some implementations, MME 215 may determine an amount of time that has elapsed since a most recent update to the local roaming policy data structure. If the amount of time satisfies a threshold value (e.g., is less than the threshold value), then MME 215 may determine that the local roaming policy data structure is up to date. If the amount of time does not satisfy the threshold value (e.g., is greater than the threshold value), then MME 215 may determine that the local roaming policy data structure is not up to date.

Additionally, or alternatively, MME 215 may determine whether the local roaming policy data structure is up to date by determining whether the network ID, associated with mobile device 205, is stored in the local roaming policy data structure. If the network ID is stored in the local roaming policy data structure, then MME 215 may determine that the local roaming policy data structure is up to date. If the network ID is not stored in the local roaming policy data structure, then MME 215 may determine that the local roaming policy data structure is not up to date.

In some implementations, MME 215 may request and receive, from central storage device 240, a list of network IDs and/or corresponding dates/times at which the network IDs and/or roaming policy information associated with the network IDs were updated (e.g., a list of all of the network IDs and corresponding dates/times stored by the global roaming policy data structure, a subset of all of the network IDs and corresponding dates/times, a particular quantity of most recently updated network IDs and corresponding dates/times, etc.). MME 215 may compare the received list to network IDs and/or dates/times stored by the local roaming policy data structure to determine whether the local roaming policy data structure is up to date (e.g., to determine whether any items in the received list are missing from the local roaming policy data structure).

Additionally, or alternatively, MME 215 may provide a list of network IDs and/or dates/times stored by the local roaming policy data structure (e.g., all network IDs and corresponding dates/times stored by the local roaming policy data structure, a subset of network IDs and dates/times, a particular quantity of most recently updated network IDs and dates/times, etc.) to central storage device 240, and central storage device 240 may compare the received list to network IDs and/or dates times stored by the global roaming policy data structure to determine whether the local roaming policy data structure, stored by MME 215, is up to date.

As further shown in FIG. 6, if the local roaming policy data structure is not up to date (block 620—NO), then process 600 may include requesting and receiving update(s) to the local roaming policy data structure (block 630). For example, if MME 215 determines that the local roaming policy data structure is not up to date, then MME 215 may request, from central storage device 240, an update to the local roaming policy data structure. Central storage device 240 may provide an update based on a global roaming policy data structure, as described herein in connection with FIG. 4.

In some implementations, MME 215 may provide, to central storage device 240, information that identifies a date and/or a time associated with a most recent update to the local roaming policy data structure. Central storage device 240 may determine one or more network IDs and/or roaming policies added to or updated in a global roaming policy data structure, stored by central storage device 240, since the most recent update to the local roaming policy data structure. Based on the request from MME 215, central storage device 240 may provide, to MME 215, information that identifies the added and/or updated network IDs and roaming policies. MME 215 may use this information to update the local roaming policy data structure.

Additionally, or alternatively, MME 215 may request a roaming policy associated with a particular network ID (e.g., the network ID associated with mobile device 205 from which the roaming request was received), and central storage device 240 may provide information that identifies a roaming policy associated with the particular network ID. Additionally, or alternatively, MME 215 may provide a copy of the local roaming policy data structure to central storage device 240. Central storage device 240 may store information that identifies a relationship between a particular MME 215 and a particular local roaming policy data structure. Central storage device 240 may determine network ID(s) and/or roaming policy information to provide to MME 215 based on comparing the global roaming policy data structure to a local roaming policy data structure associated with MME 215.

In some implementations, central storage device 240 may determine that no network IDs and/or roaming policies have been added to or updated in the global roaming policy data structure since a most recent update to the local roaming policy data structure. In this case, central storage device 240 may provide, to MME 215, an indication that the local roaming policy data structure stored by MME 215 is up to date. MME 215 may store this indication, and may store information that identifies the date and/or time that the indication was received as a most recent update.

As further shown in FIG. 6, if the local roaming policy data structure is up to date (block 620—YES), then process 600 may include identifying, using the local roaming policy data structure, a roaming policy associated with the network ID (block 640), and applying the roaming policy to the request associated with the mobile device (block 650). For example, MME 215 may identify a roaming policy associated with the network ID identified based on the request from mobile device 205. In some implementations, MME 215 may search the local roaming policy data structure, using the network ID, to identify a roaming policy that shares a relationship with the network ID. Additionally, or alternatively, MME 215 may determine that the network ID is not stored in the local roaming policy data structure. In this case, MME 215 may apply a default roaming policy to mobile device 205 (e.g., which may be stored using the local roaming policy data structure or another data structure).

MME 215 may apply the roaming policy by handling traffic, associated with mobile device 205 (e.g., traffic destined for and/or received from mobile device 205), in a manner indicated by the roaming policy. Additionally, or alternatively, MME 215 may apply the roaming policy by instructing one or more other devices (e.g., base station 210, SGW 220, PGW 225, HSS 230, AAA 235, etc.) to handle traffic associated with mobile device 205 in a manner indicated by the roaming policy.

As an example, MME 215 may allow mobile device 205 to roam via a visited network (e.g., to access the visited network, to access a home network, to access a visited network and/or a home network service, to transfer traffic via the visited network, etc.). As another example, MME 215 may block mobile device 205 from roaming via the visited network. As another example, MME 215 may offer an option for mobile device 205 to roam via the visited network in exchange for a payment, in exchange for viewing an advertisement, in exchange for sharing (e.g., with a network operator of the visited network) information associated with mobile device 205 and/or a user of mobile device 205, etc. Other examples of applying the roaming policy are described in more detail elsewhere herein. In this way, MME 215 may use a centralized storage device (e.g., central storage device 240) to assist in managing roaming policies to be applied to roaming mobile devices 205.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
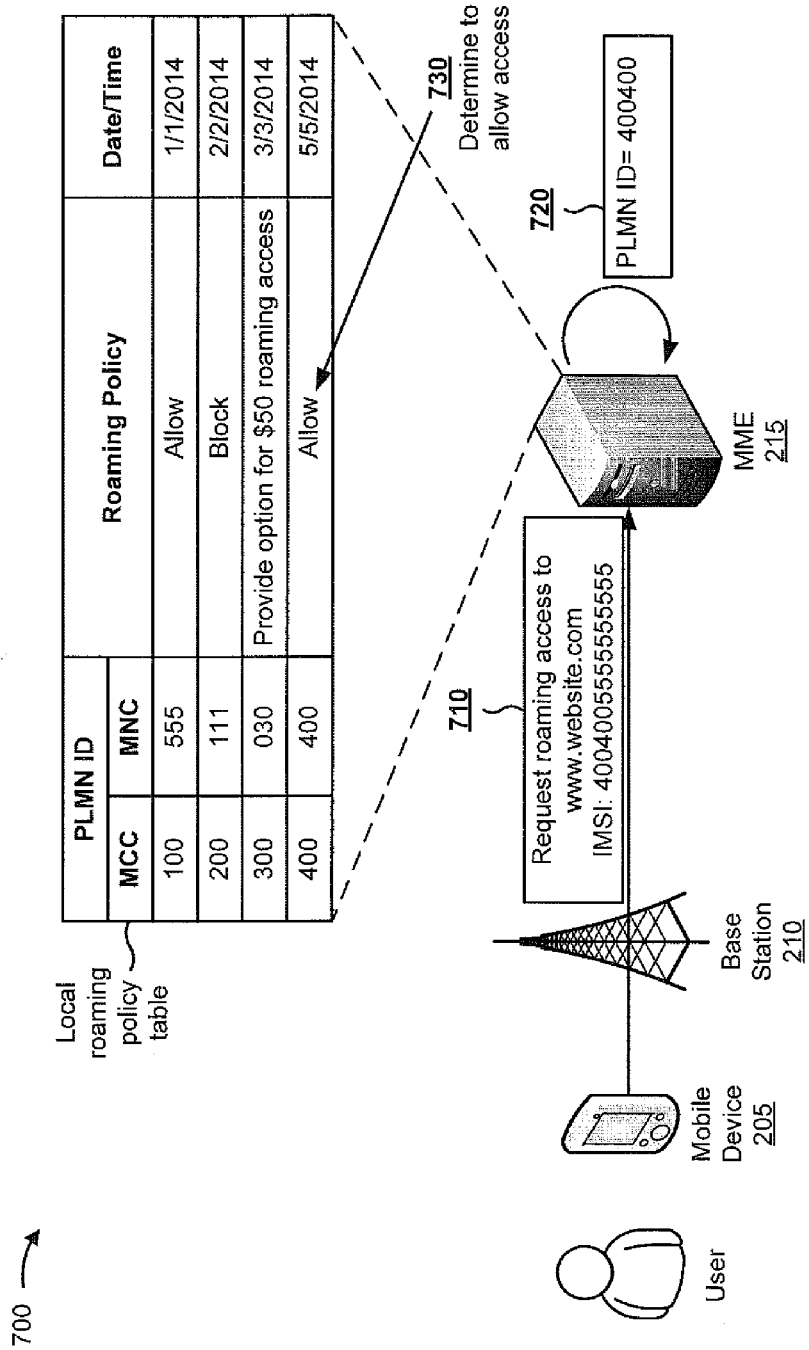
FIGS. 7A and 7B are diagrams of an example implementation relating to the example process shown in FIG. 6.
Figure 7B:
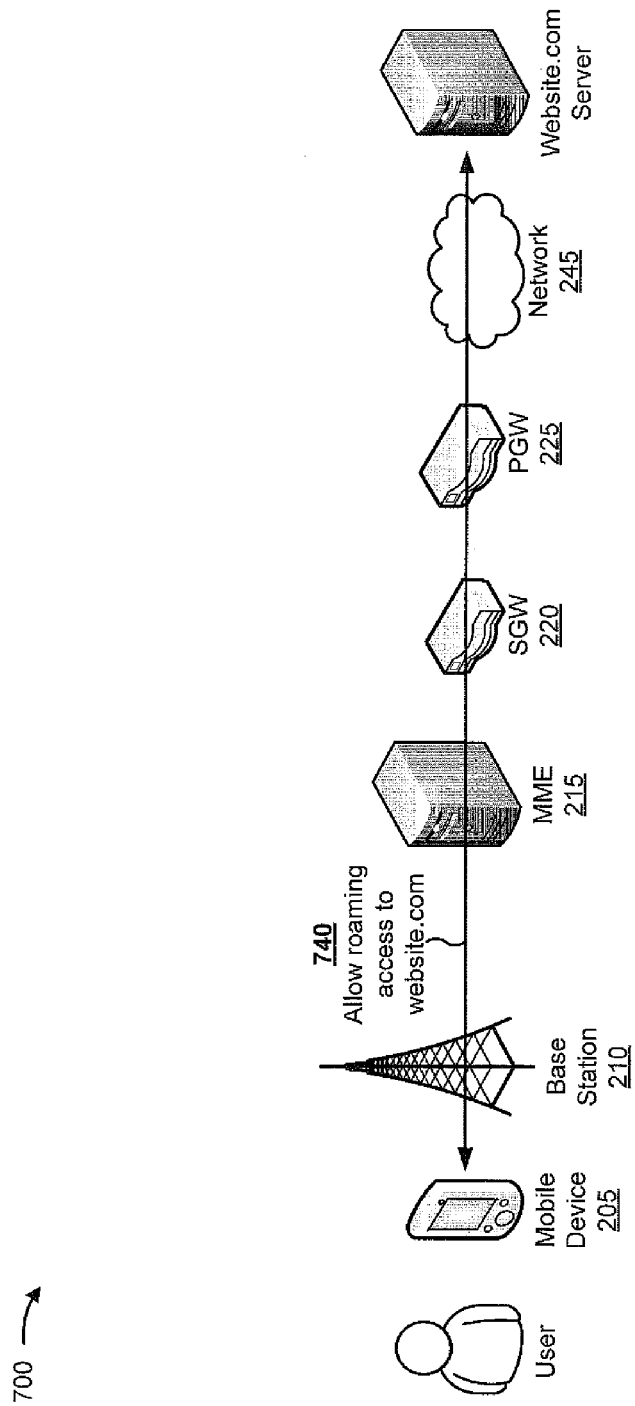

FIGS. 7A and 7B are diagrams of an example implementation 700 relating to example process 600 shown in FIG. 6. FIGS. 7A and 7B show an example of applying a roaming policy to a roaming request from a mobile device. For the purpose of FIGS. 7A and 7B, assume that the operations described herein in connection with FIGS. 5A and 5B have been performed.

As shown in FIG. 7A, and by reference number 710, assume that a user interacts with mobile device 205 to provide (via base station 210) a roaming request to MME 215. As shown, assume that the roaming request is a request to access a website shown as www.website.com, and that the request identifies an IMSI of "4004005555555555," which identifies mobile device 205 (e.g., via an MCC of 400, an MNC of 400, and an MSIN of 555-555-5555). As shown by reference number 720, assume that MME 215 uses the IMSI to determine a PLMN ID associated with mobile device 205, shown as "400400."

As further shown, assume that MME 215 uses the PLMN ID of "400400" to search a local roaming policy table to identify a roaming policy of "Allow" associated with the PLMN ID of "400400." As shown by reference number 730, based on the identified roaming policy, assume that MME 215 determines to allow mobile device 205 to access the requested website (www.website.com) by roaming using a visited network associated with MME 215.

As shown in FIG. 7B, assume that MME 215 applies the roaming policy to allow mobile device 205 to access the requested website (e.g., a website.com server device) via the visited network. For example, MME 215 may provide instructions to permit traffic associated with mobile device 205 to be accepted and handled by base station 210, SGW 220, and/or PGW 225, to allow mobile device 205 to access a website.com server (e.g., via network 245, which may include the Internet and/or a home network associated with mobile device 205). Additionally, or alternatively, MME 215 may cause information associated with mobile device 205 and/or traffic associated with mobile device 205 to be provided to a home network associated with mobile device 205.

As indicated above, FIGS. 7A and 7B are provided merely as an example. Other examples are possible and may differ from what was described with regard to FIGS. 7A and 7B.

FIGS. 8A-8D are diagrams of another example implementation 800 relating to example process 600 shown in FIG. 6. FIGS. 8A-8D show another example of applying a roaming policy to a roaming request from a mobile device. For the purpose of FIGS. 8A-8D, assume that the operations described herein in connection with FIGS. 5A and 5B have been performed.

Figure 8A:
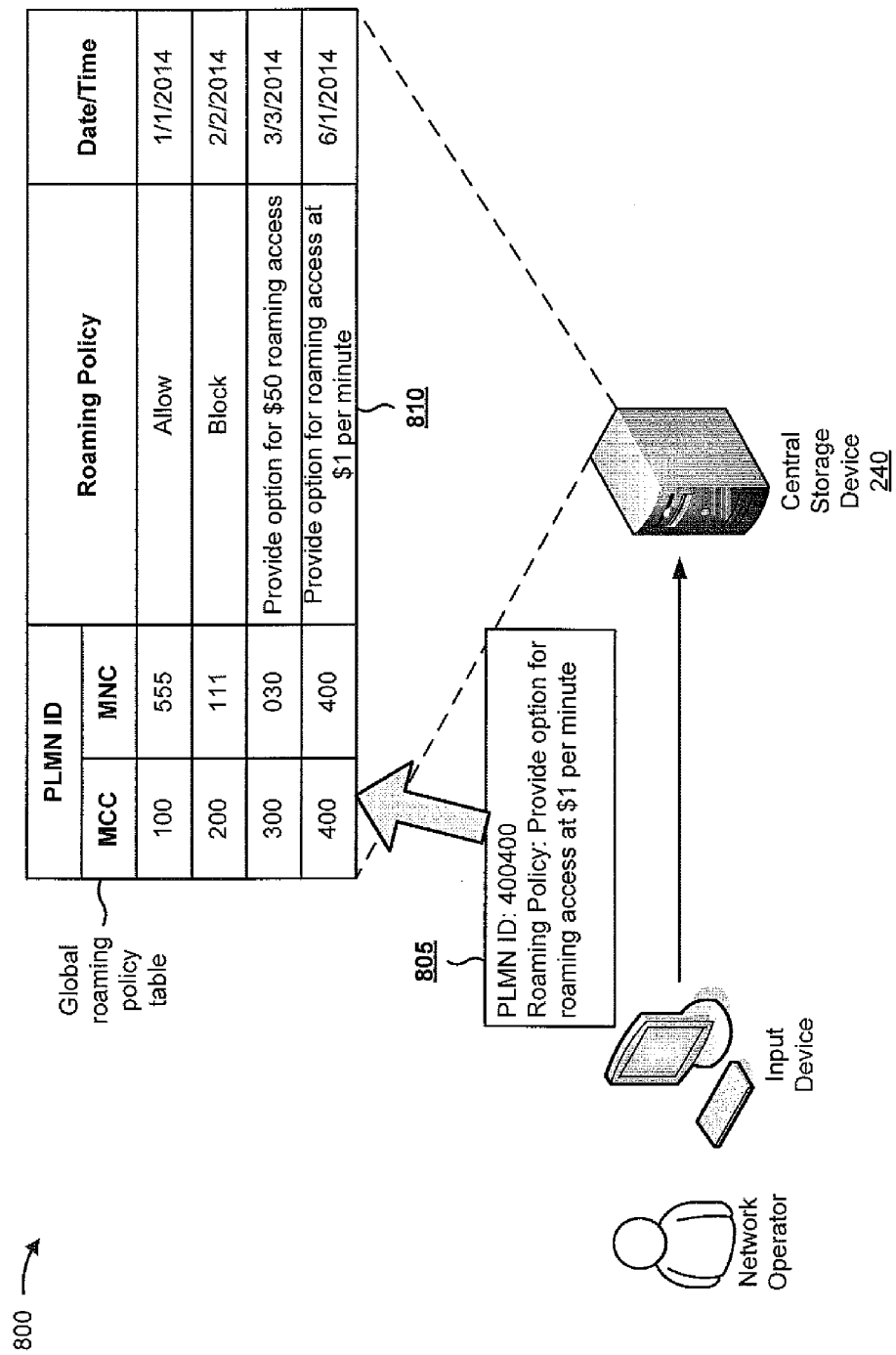
FIGS. 8A-8D are diagrams of another example implementation relating to the example process shown in FIG. 6.

As shown in FIG. 8A, and by reference number 805, assume that a network operator interacts with an input device to identify a PLMN ID, shown as "400400," and a roaming policy, shown as "Provide option for roaming access at $1 per minute," associated with the PLMN ID. Assume that the network operator is associated with a first PLMN, and that the network operator enters into an agreement with another network operator, associated with a second PLMN identified by the PLMN ID "400400." Further, assume that the agreement will allow mobile devices 205, associated with the second PLMN, to roam using the first PLMN if a user of mobile device 205 agrees to pay $1 per minute.

Assume that central storage device 240 receives the input information from the input device, and determines that a PLMN ID of "400400" is already stored in the global roaming policy table (e.g., as shown in FIG. 5A). In this case, central storage device 240 replaces old roaming policy information, associated with the PLMN ID of "400400" (e.g., "Allow"), and stores the new roaming policy information (e.g., "Provide option for roaming access at $1 per minute") in association with the PLMN ID of "400400," as shown by reference number 810. Further, assume that central storage device 240 stores information that identifies when the roaming policy, associated with the PLMN ID of "400400," was updated, shown as "Jun. 1, 2014."

Figure 8B:
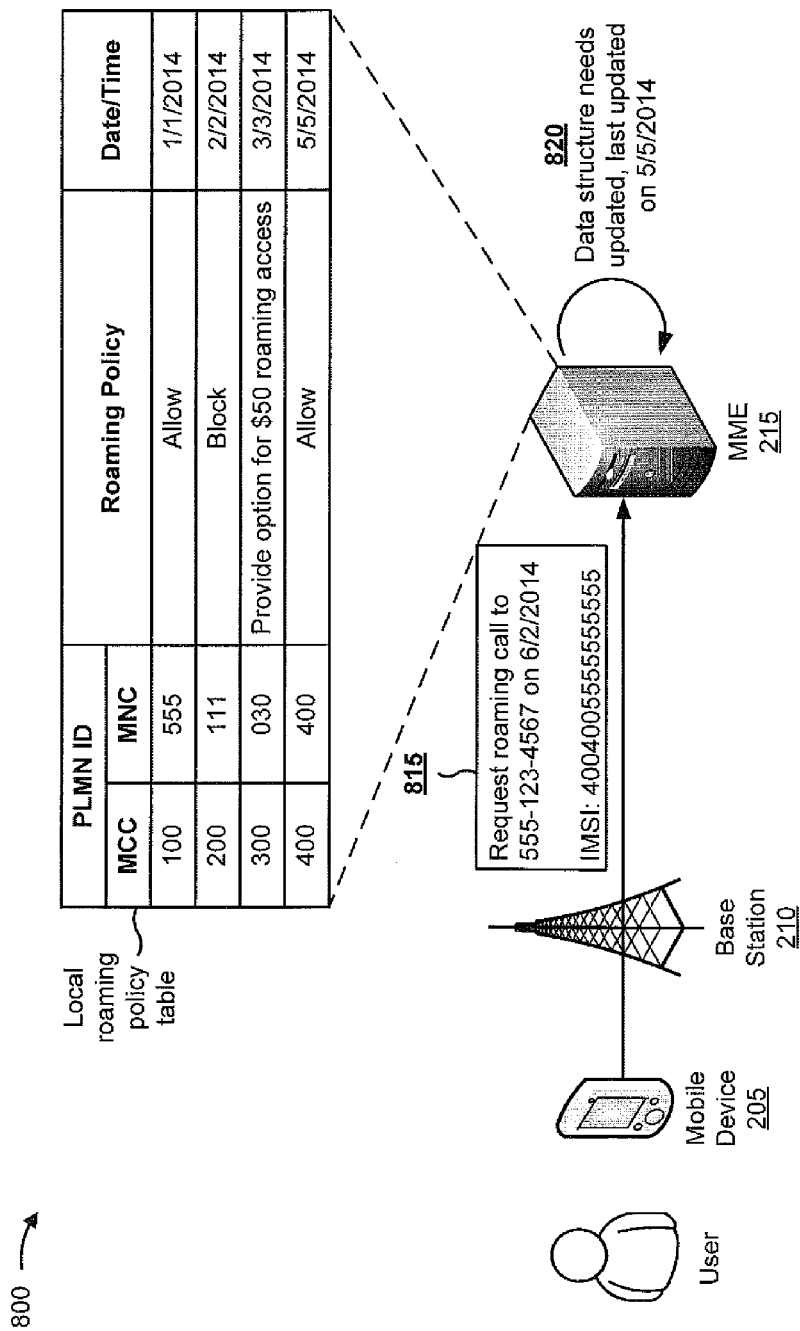

As shown in FIG. 8B, and by reference number 815, assume that a user interacts with mobile device 205 to provide (via base station 210) a roaming request to MME 215. As shown, assume that the roaming request is a request for a roaming phone call to a phone number shown as "555-123-4567," and that the request identifies an IMSI of "4004005555555555," which identifies mobile device 205 (e.g., via an MCC of 400, an MNC of 400, and an MSIN of 555-555-5555). As further shown, assume that the roaming request is made on Jun. 2, 2014. As shown by reference number 820, assume that MME 215 determines that a local roaming policy table, stored by MME 215, has not been updated for a threshold amount of time (e.g., since May 5, 2014), and determines to update the local roaming policy table.

Figure 8C:
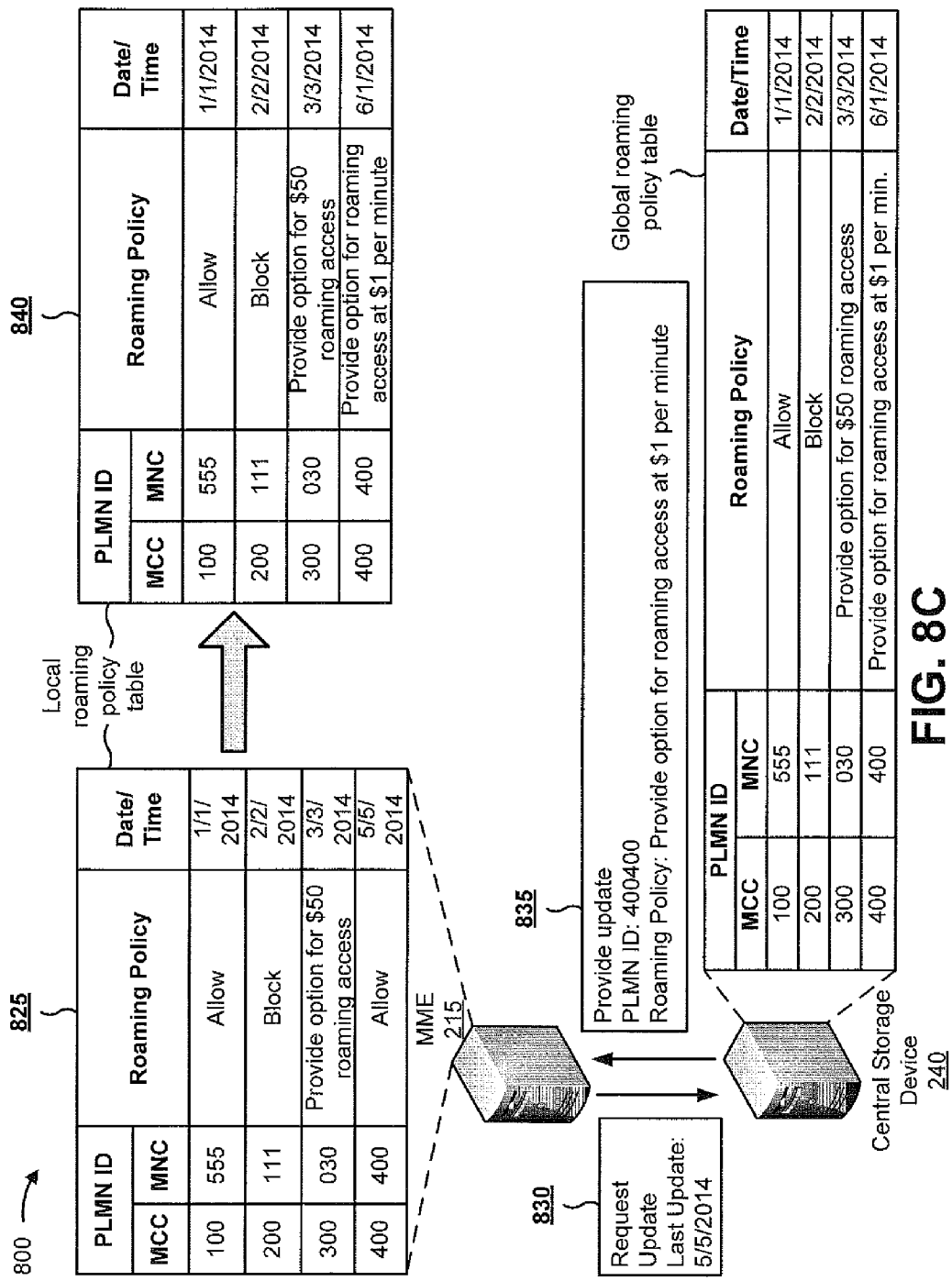

As shown in FIG. 8C, and by reference number 825, assume that a local roaming policy table, stored by MME 215, includes old roaming policy information for the PLMN ID of "400400" (e.g., "Allow"), and has not yet been updated to include the new roaming policy information. As shown by reference number 830, assume that MME 215 requests an update from central storage device 240, and further provides information that identifies a date/time of a most recent update to the local roaming policy table, shown as May 5, 2014.

Assume that central storage device 240 uses the date/time of the most recent update (e.g., May 5, 2014) to identify PLMN IDs and roaming policies that have not been provided to MME 215. For example, assume that central storage device 240 determines that an updated roaming policy for the PLMN ID of "400400" has not been provided to MME 215, because this information was added to the global roaming policy table on Jun. 1, 2014, which is after the most recent update of May 5, 2014. Based on this determination, assume that central storage device 240 provides information that identifies the PLMN ID of "400400" and the corresponding roaming policy of "Provide option for roaming access at $1 per minute" to MME 215, as shown by reference number 835. As shown by reference number 840, assume that MME 215 updates the local roaming policy table with the received information.

Figure 8D:
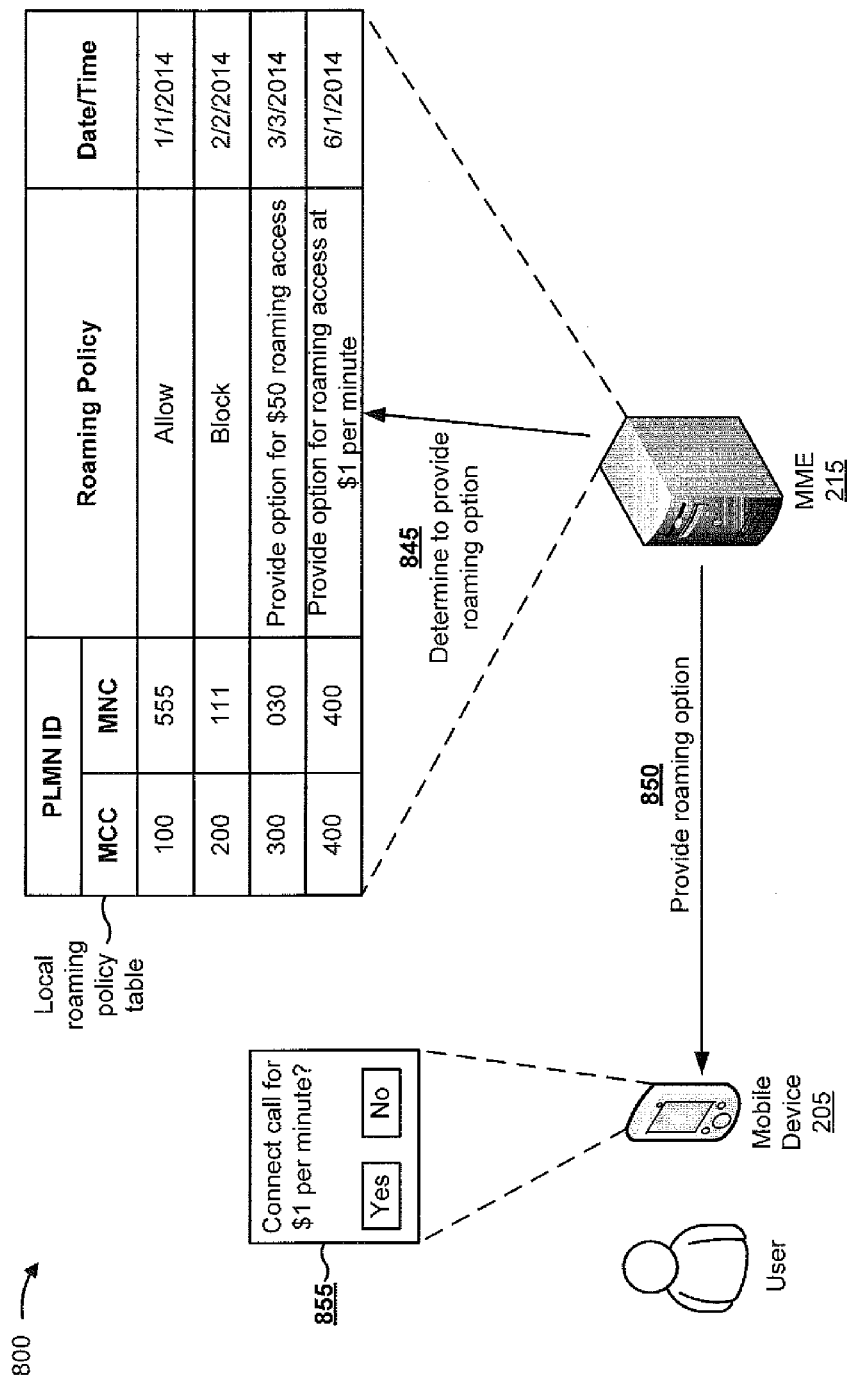

As shown in FIG. 8D, and by reference number 845, based on the update to include the new roaming policy information in the local roaming policy data structure, assume that MME 215 determines to provide a roaming option to mobile device 205. As shown by reference number 850, assume that MME 215 provides the roaming option to mobile device 205. As shown by reference number 855, assume that providing the roaming option causes mobile device 205 to prompt the user to accept or decline an option to connect the requested phone call for $1 per minute. In this way, MME 215 may apply a roaming policy, managed by a centralized storage device (e.g., central storage device 240), to mobile device 205.

As indicated above, FIGS. 8A-8D are provided merely as an example. Other examples are possible and may differ from what was described with regard to FIGS. 8A-8D.

Figure 9A:
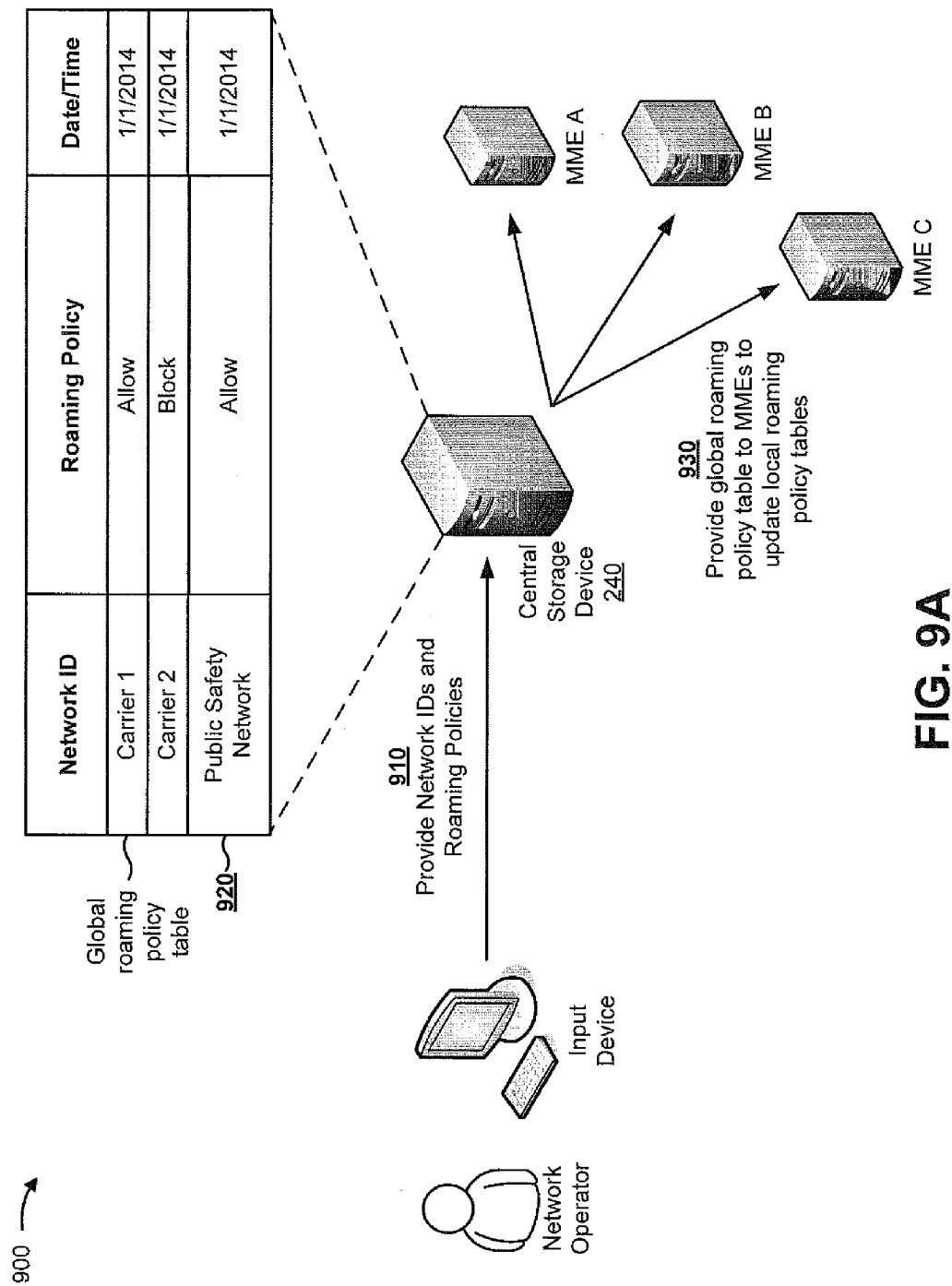
FIGS. 9A and 9B are diagrams of another example implementation relating to the examples processes shown in FIG. 4 and FIG. 6.

FIGS. 9A and 9D are diagrams of another example implementation 900 relating to examples processes 400 and 600 shown in FIG. 4 and FIG. 6.

As shown in FIG. 9A, and by reference number 910, assume that a network operator interacts with an input device (e.g., a desktop computer, a laptop computer, etc.) to identify network IDs and roaming policies associated with the network IDs. Assume that central storage device 240 receives the input information from the input device, and stores the network IDs and roaming policy information in a global roaming policy table, as shown by reference number 920. As shown, assume that the global roaming policy table stores a network ID, roaming policy information associated with the network ID, and a date/time at which the global roaming policy table was updated to include the network ID and the roaming policy information.

For example, the first row of the table indicates that mobile devices 205, associated with a network ID of "Carrier 1" (e.g., a network operator), are to be allowed to roam via a network associated with central storage device 240, and that this network ID (e.g., "Carrier 1") and roaming policy information (e.g., "Allow") were added to or updated in the global roaming policy table on Jan. 1, 2014. Similarly, the second row of the table indicates that mobile devices 205, associated with a network ID of "Carrier 2," are to be blocked from roaming via the network associated with central storage device 240, and that this network ID (e.g., "Carrier 2") and roaming policy information were added to or updated in the global roaming policy table on Jan. 1, 2014. The third row of the table indicates that mobile devices 205, associated with a network ID of "Public Safety Network," are to be allowed to roam via the network associated with central storage device 240, and that this network ID (e.g., "Public Safety Network") and roaming policy information (e.g., "Allow") were added to or updated in the global roaming policy table on Jan. 1, 2014. While example implementation 900 shows network IDs stored as names, central storage device 240 may store PLMN IDs, in some implementations.

As shown by reference number 930, assume that central storage device 240 provides the global roaming policy table to MME A, MME B, and MME C to update local roaming policies stored by these MMEs.

Figure 9B:
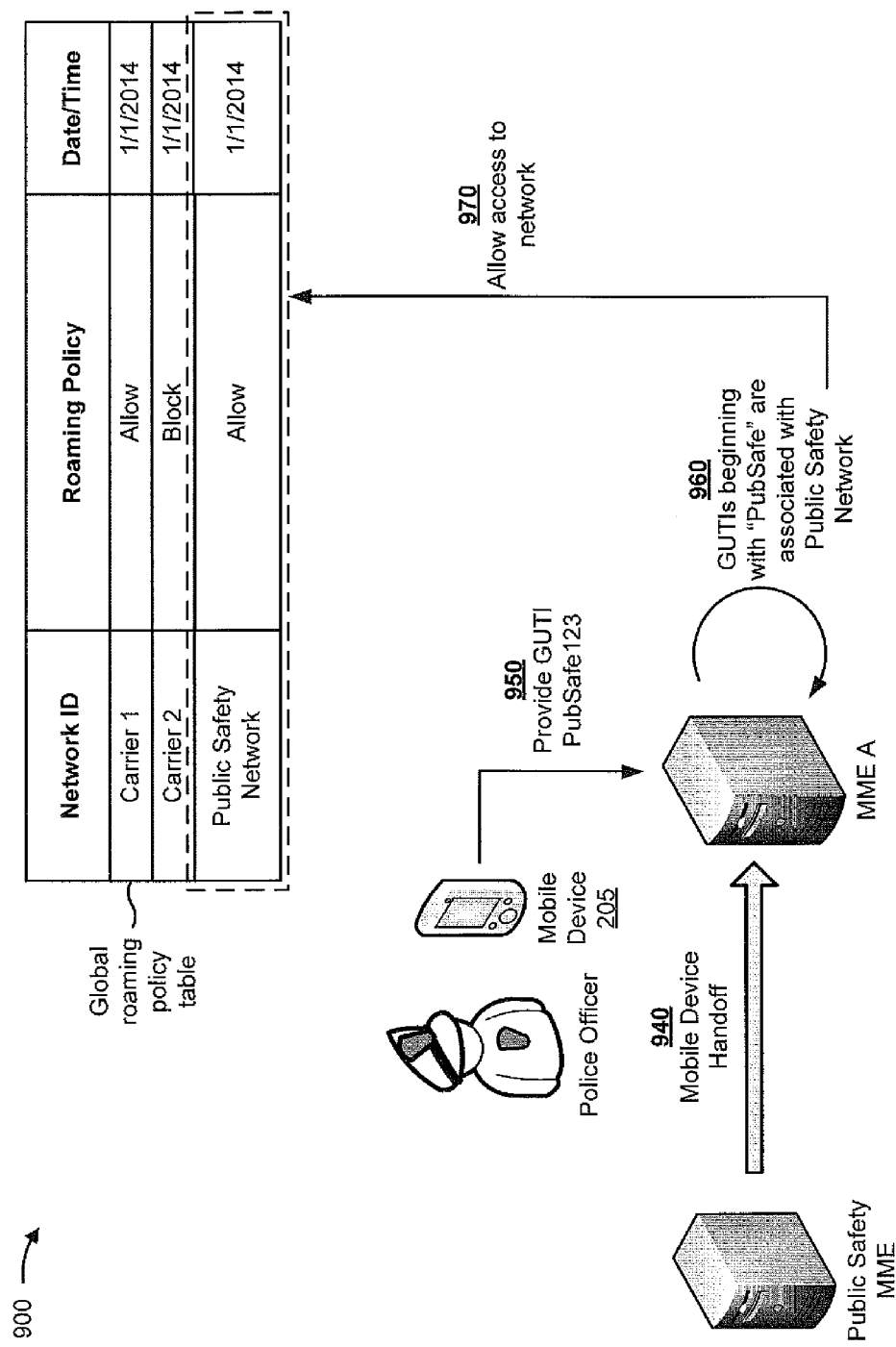

As shown in FIG. 9B, and by reference number 940, assume that a police officer, using mobile device 205, is traveling from a first service area, serviced by a public safety MME, to a second service area serviced by MME A. Assume that mobile device 205 is handed off from the public safety MME to MME A. As shown by reference number 950, as part of the handoff operation, assume that mobile device 205 provides a globally unique temporary identifier (GUTI) (e.g., received from public safety MME or another device associated with a public safety network) to MME A. As shown, assume that the GUTI includes a network ID identifying a Public Safety network (e.g., "PubSafe123").

As shown by reference number 960, assume that MME A determines (e.g., using a data structure) that GUTIs corresponding to the Public Safety Network ID (e.g., including "PubSafe123") are associated with a public safety network. As shown by reference number 970, assume that MME A determines that mobile devices 205 being handed off from the public safety network are to be allowed access to a network serviced by MME A. Thus, assume that MME A allows mobile device 205 to access the network. In this way, central storage device 240 and MMEs 215 may manage roaming policies when mobile devices 205 are handed off from another network.

As indicated above, FIGS. 9A and 9B are provided merely as an example. Other examples are possible and may differ from what was described with regard to FIGS. 9A and 9B.

Implementations described herein simplify the configuration and management of roaming policies across a large network (e.g., multiple MMEs 215) by using a centralized storage device (e.g., central storage device 240).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive a network identifier and roaming policy information associated with the network identifier,
   the roaming policy information identifying a manner in which to treat traffic associated with mobile devices that are associated with a home network identified by the network identifier;
   store the network identifier and the roaming policy information using a global roaming policy data structure;
   determine a time associated with a previous update to a local roaming policy data structure accessible by a mobility management entity device,
   the mobility management entity device being one of a plurality of mobility management entity devices having access to a respective plurality of local roaming policy data structures,
   the plurality of local roaming policy data structures including the local roaming policy data structure;
   determine that the network identifier and the roaming policy information were received after the time; and
   provide, based on determining that the network identifier and the roaming policy information were received after the time, the network identifier and the roaming policy information to the mobility management entity device for storage using the local roaming policy data structure.

2. The device of claim 1, where the one or more processors, when providing the network identifier and the roaming policy information, are to:
   receive a request, from the mobility management entity device, for an update to the local roaming policy data structure; and
   provide, to the mobility management entity device and based on the request, the network identifier and the roaming policy information.

3. The device of claim 1, where the one or more processors, when determining the time associated with the previous update, are to:
   receive a request, from the mobility management entity device, for an update to the local roaming policy data structure; and
   determine the time associated with the previous update based on receiving the request.

4. The device of claim 1, where the network identifier includes a public land mobile network (PLMN) identifier.

5. The device of claim 1, where the one or more processors, when providing the network identifier and the roaming policy information, are to:
   determine to update the local roaming policy data structure associated with the mobility management entity device;
   determine that the network identifier or the roaming policy information is not stored by the local roaming policy data structure; and
   provide, based on determining that the network identifier or the roaming policy information is not stored by the local roaming policy data structure, the network identifier and the roaming policy information to the mobility management entity device.

6. The device of claim 1, where the one or more processors, when receiving the network identifier and the roaming policy information, are to:
   receive a new network identifier that is not stored by the global roaming policy data structure;
   receive new roaming policy information associated with the new network identifier; and
   where the one or more processors, when providing the network identifier and the roaming policy information, are to:
   provide the new network identifier and the new roaming policy information to the mobility management entity device.

7. The device of claim 1, where the one or more processors, when receiving the network identifier and the roaming policy information, are to:
   receive updated roaming policy information associated with an existing network identifier stored by the global roaming policy data structure; and
   where the one or more processors, when providing the network identifier and the roaming policy information, are to:
   provide the network identifier and the updated roaming policy information to the mobility management entity device.

8. A non-transitory computer-readable medium storing instructions, the instructions comprising:
   one or more instructions that, when executed by one or more processors, cause the one or more processors to:
   receive a network identifier and roaming policy information associated with the network identifier,
   the roaming policy information identifying a manner in which to treat traffic associated with mobile devices registered with a network identified by the network identifier;
   store the network identifier and the roaming policy information using a global roaming policy data structure;
   provide the network identifier and the roaming policy information to a first mobility management entity device for storage using a first local roaming policy data structure accessible by the first mobility management entity device;

determine a time associated with an update to a second local roaming policy data structure accessible by a second mobility management entity device, the second mobility management entity device being different from the first mobility management entity device, and the second local roaming policy data structure being different from the first local roaming policy data structure;

determine that the network identifier and the roaming policy information were received after the time; and provide, based on determining that the network identifier and the roaming policy information were received after the time, the network identifier and the roaming policy information to the second mobility management entity device for storage using the second local roaming policy data structure.

9. The non-transitory computer-readable medium of claim 8, where the one or more instructions, that cause the one or more processors to provide the network identifier and the roaming policy information to the first mobility management entity device and the second mobility management entity device, further cause the one or more processors to:

receive a first request, from the first mobility management entity device, for an update to the first local roaming policy data structure;

provide, based on the first request, the network identifier and the roaming policy information to the first mobility management entity device;

receive a second request, from the second mobility management entity device, for an update to the second local roaming policy data structure, the second request being received at a different time than the first request; and provide, based on the second request, the network identifier and the roaming policy information to the second mobility management entity device.

10. The non-transitory computer-readable medium of claim 8, where the time is a first time; and where the one or more instructions, that cause the one or more processors to provide the network identifier and the roaming policy information to the first mobility management entity device, further cause the one or more processors to:

receive a request, from the first mobility management entity device, for an update to the first local roaming policy data structure;

determine a second time associated with a previous update to the first local roaming policy data structure;

determine that the network identifier and the roaming policy information were received after the second time; and provide, based on determining that the network identifier and the roaming policy information were received after second time, the network identifier and the roaming policy information to the first mobility management entity device.

11. The non-transitory computer-readable medium of claim 8, where the network identifier is associated with a globally unique temporary identifier assigned to a mobile device associated with a hand-off operation involving the first mobility management entity device or the second mobility management entity device.

12. The non-transitory computer-readable medium of claim 8, where the one or more instructions, that cause the one or more processors to provide the network identifier and the roaming policy information to the first mobility management entity device, further cause the one or more processors to:

determine to update the first local roaming policy data structure associated with the first mobility management entity device;

determine that the network identifier or the roaming policy information has not been provided to the first mobility management entity device; and provide, based on determining that the network identifier or the roaming policy information has not been provided to the first mobility management entity device, the network identifier and the roaming policy information to the first mobility management entity device.

13. The non-transitory computer-readable medium of claim 8, where the one or more instructions, that cause the one or more processors to provide the network identifier and the roaming policy information to the first mobility management entity device and the second mobility management entity device, further cause the one or more processors to:

receive information that identifies a geographic region in which a roaming policy, identified by the roaming policy information, is to be applied;

determine that the first mobility management entity device and the second mobility management entity device are associated with the geographic region; and provide, based on determining that the first mobility management entity device and the second mobility management entity device are associated with the geographic region, the network identifier and the roaming policy information to the first mobility management entity device and the second mobility management entity device.

14. The non-transitory computer-readable medium of claim 8, where the one or more instructions, that cause the one or more processors to provide the network identifier and the roaming policy information to the first mobility management entity device, further cause the one or more processors to:

provide an indication, to the first mobility management entity device, that an update to the first local roaming policy data structure is available;

receive, from the first mobility management entity device and based on providing the indication, a request to update the first local roaming policy data structure; and provide, based on receiving the request, the network identifier and the roaming policy information to the first mobility management entity device.

15. A method, comprising:

receiving, by a device, a network identifier and roaming policy information associated with the network identifier, the roaming policy information identifying a manner in which to treat traffic associated with mobile devices that are associated with a home network identified by the network identifier;

storing, by the device, the network identifier and the roaming policy information using a global roaming policy data structure;

determining, by the device, a time associated with a previous update to at least one local roaming policy data structure of a plurality of local roaming policy data structures corresponding to a plurality of mobility management entity devices, each mobility management entity device, of the plurality of mobility management entity devices, having access to a different local roaming policy data structure of the plurality of local roaming policy data structures;

determining, by the device, that the network identifier and the roaming policy information were received after the time; and selectively providing, by the device and based on determining that the network identifier and the roaming policy information were received after the time, the network identifier and the roaming policy information to a plurality of mobility management entity devices for storage using the plurality of local roaming policy data structures, the network identifier and the roaming policy information permitting at least one of the plurality of mobility management entity devices to process the traffic associated with the mobile devices based on the roaming policy information.

16. The method of claim 15, where selectively providing the network identifier and the roaming policy information comprises:

providing the network identifier and the roaming policy information to a first mobility management entity device of the plurality of mobility management entity devices without providing the network identifier and the roaming policy information to a second mobility management entity device of the plurality of mobility management entity devices.

17. The method of claim 15, where determining the time associated with the previous update comprises:

receiving a request, from a mobility management entity device of the plurality of mobility management entity devices, to update a local roaming policy data structure, of the plurality of local roaming policy data structures, associated with the mobility management entity device, the request identifying the time associated with the previous update to the local roaming policy data structure; and determining the time identified by the request.

18. The method of claim 15, further comprising:

determining that a first mobility management entity device, of the plurality of mobility management entity devices, has not been provided the network identifier or the roaming policy information;

determining that a second mobility management entity device, of the plurality of mobility management entity devices, has been provided the network identifier and the roaming policy information; and where selectively providing the network identifier and the roaming policy information comprises:

providing the network identifier and the roaming policy information to the first mobility management entity device without providing the network identifier and the roaming policy information to the second mobility management entity device.

19. The method of claim 15, where selectively providing the network identifier and the roaming policy information comprises:

determining that a time period, associated with updating the plurality of local roaming policy data structures, has elapsed; and providing the network identifier and the roaming policy information based on determining that the time period has elapsed.

20. The method of claim 15, further comprising:

receiving updated roaming policy information associated with the network identifier;

replacing the roaming policy information with the updated roaming policy information in the global roaming policy data structure; and providing the network identifier and the updated roaming policy information to the plurality of mobility management entity devices.

\* \* \* \* \*